UNITED STATES PATENT OFFICE.

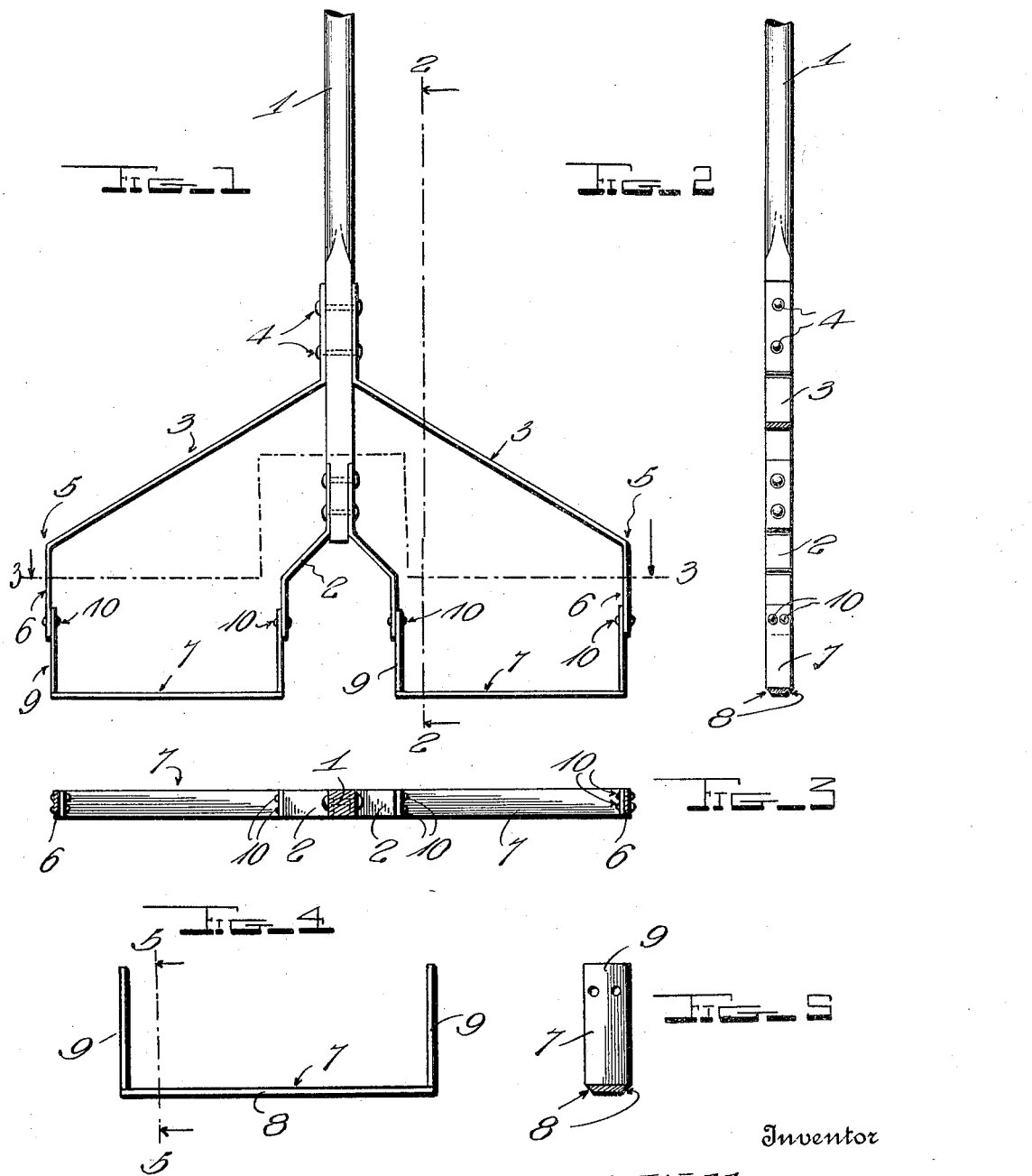

HOWARD O. WILKINSON, OF KINGFISHER, OKLAHOMA.

COTTON SPACER.

1,402,819.  Specification of Letters Patent.  Patented Jan. 10, 1922.

Application filed April 28, 1921. Serial No. 465,076.

*To all whom it may concern:*

Be it known that I, HOWARD O. WILKINSON, citizen of the United States, residing at Kingfisher, in the county of Kingfisher and State of Oklahoma, have invented certain new and useful Improvements in Cotton Spacers; and I do declare the following to be a full, clear, and exact description of the invention, such as will enable others skilled in the art to which it appertains to make and use the same.

This invention relates to an improved implement which is especially, although not necessarily, designed for spacing cotton, and the principal object of the invention is to provide an implement of this class which is such in construction that it will straddle one plant and simultaneously remove the ones on opposite sides of the said one plant when drawn cross-wise of the row.

Another object of the invention is to generally improve upon implements of this class by the provision of one of extreme simplicity and durability which is exceedingly strong, the parts being so arranged and braced that the cutting edges of the blades can be easily embedded in the ground regardless of the condition of the latter and without possibility of bending, twisting or breaking any of the parts of the implement such as is the case with patented and marketed implements with which I am familiar.

Another object of the invention is to provide an implement of this class wherein the parts are such, that when pressure is exerted on the handle, one cutter will not be embedded deeper in the ground than the other cutter, thus insuring an even and uniform cultivation of the ground with an easy straight pull on the handle of the implement.

Other objects and advantages of the invention will be apparent during the course of the following description.

In the accompanying drawings forming a part of this specification and in which like numerals are employed to designate like parts throughout the same:

Figure 1 is a top plan view of a cultivating implement constructed in accordance with this invention.

Figures 2 and 3 are sections taken on the planes of the lines 2—2 and 3—3 respectively of Figure 1.

Figure 4 is a detailed view of one of the cutters.

Figure 5 is a sectional view taken on the line 5—5 of Figure 4.

Referring to the drawings by numerals, 1 designates a suitable handle which has permanently secured to its outer end, a pair of spaced metal arms 2, which extend beyond the outer end of the handle and have their ends terminated at points opposite one another. The numeral 3 is employed to designate a pair of diagonal braces which are secured at their inner ends to the handle as indicated at 4 and extend at their outer ends beyond the corresponding end of the handle, being bent intermediate their ends as indicated at 5 to dispose the portion 6 in parallelism with the outer ends of the arms 2. The extremities of the braces 3 terminate at a point opposite the free or outer ends of the arms 2. The implement in addition to embodying the aforesaid parts, includes a pair of cutting blades 7 which are merely in the form of metal strips having their opposite longitudinal edges sharpened as indicated at 8. In order to connect the cutters with the arms and braces, the opposite ends thereof are bent laterally rearward as indicated at 9, being riveted or otherwise secured to the adjacent arms and braces as indicated at 10. With this construction, it will be seen that sufficient space will be provided between the cutters to enable the implement to be placed over the row of cotton to cultivate the ground on opposite sides of said row without interfering with or in any way injuring the plants. Also, as hereinbefore indicated, the implement is intended to be drawn crosswise of the row to straddle one plant while removing the plants on opposite sides.

A careful consideration of the foregoing description taken in connection with the accompanying drawings is thought to be sufficient to enable persons skilled in the art to which the invention relates to obtain a clear understanding of the construction, and manner of using the same. Therefore, a more lengthy description is deemed unnecessary.

While I have described my improved implement as being especially designed for cultivating the ground between the rows of crops, I wish it to be understood that it will serve equally well in various other capacities where such implements are needed.

I claim:

An implement of the type described comprising a handle, a pair of spaced arms secured to the outer end thereof and having their ends terminating directly opposite one another, a pair of divergent braces secured at their inner ends to the handle and extending beyond the outer end thereof, being bent at points opposite one another and opposite the outer end of the handle so that their free end portions extend in parallelism with the outer end portions of said arms, the extremities of the braces terminating opposite the free end of the latter, and a pair of spaced cutting strips having their opposite ends bent laterally inward and secured to the ends of the adjacent arms and braces.

In testimony whereof I have hereunto set my hand.

HOWARD O. WILKINSON.